(12) United States Patent
Arata

(10) Patent No.: US 8,616,636 B2
(45) Date of Patent: Dec. 31, 2013

(54) VEHICLE SEAT

(75) Inventor: Kazuyoshi Arata, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 318 days.

(21) Appl. No.: 13/029,873

(22) Filed: Feb. 17, 2011

(65) Prior Publication Data
US 2012/0212014 A1     Aug. 23, 2012

(51) Int. Cl.
*B60N 2/42*          (2006.01)
(52) U.S. Cl.
USPC ............. 297/216.16; 297/216.1; 297/344.12; 297/344.15
(58) Field of Classification Search
USPC ................ 297/216.1, 216.16, 216.19, 216.2, 297/344.12, 344.14, 344.15
See application file for complete search history.

(56) References Cited

U.S. PATENT DOCUMENTS

| | | | | |
|---|---|---|---|---|
| 4,128,225 A | * | 12/1978 | Kluting et al. ................. | 248/421 |
| 4,229,041 A | * | 10/1980 | Werner ......................... | 297/468 |
| 4,787,594 A | * | 11/1988 | Ikegaya et al. ................. | 248/421 |
| 6,290,198 B1 | * | 9/2001 | Kojima et al. ................. | 248/422 |
| 6,966,598 B2 | * | 11/2005 | Schmale ..................... | 296/65.08 |
| 7,066,540 B2 | * | 6/2006 | Minai et al. ............... | 297/344.15 |
| 7,278,686 B2 | * | 10/2007 | Yoshida ........................ | 297/338 |
| 7,360,832 B2 | | 4/2008 | Yokota et al. | |

FOREIGN PATENT DOCUMENTS

JP         7132767 A      5/1995

* cited by examiner

*Primary Examiner* — Philip Gabler
(74) *Attorney, Agent, or Firm* — Browdy and Neimark, PLLC

(57) ABSTRACT

In a vehicle seat, first and second front links as well as first and second rear links are pivotally connected between a seat cushion frame and a floor of vehicle. The first front link has one pivot point pivotally connected with a drive pinion rotatably supported in one side of the seat cushion frame and another pivot point disposed forwardly of that one pivot point. Likewise, the second front link has one pivot point pivotally connected with the other side of the seat cushion frame and another pivot point disposed forwardly of that one pivot point. A first connecting link element is pivotally connected between the afore-said another pivot point of the first front link and the first rear link. A second connecting link element is pivotally connected between the afore-said another pivot point of the second front link and the second rear link.

3 Claims, 2 Drawing Sheets

VEHICLE SEAT

BACKGROUND OF THE INVENTION

1. Field of the Invention

The present invention relates to a vehicle seat, and in particular, the invention is directed to a vehicle seat including front and rear links which are vertically movable to allow for adjustment in height of seats, the seat being so arranged as to absorb an excessive great impact to be caused therein in the case of rear-end collision.

2. Description of Prior Art

In general, a rear-end collision may be defined to be one of the following two cases: a case where a vehicle collides against a rear side of another vehicle running ahead thereof; and a case where a vehicle running backwards collides at the rear side thereof against another vehicle or something hard. In any of such rear-end collisions, an upper body portion of seat occupant on a seat of the vehicle is abruptly and quickly displaced under inertia to a seat back of the seat, with an excessive great load being applied from the seat occupant to the seat back. This means that an excessive great impact is directly given to the seat back and further imparted to a seat cushion of the seat.

Suppose now that the rear-end collision occurs to a vehicle seat having a seat cushion frame very rigid in the entirety thereof enough to withstand the foregoing excessive great impact. In that case, it is highly possible for the excessive great impact to be intensively imparted to a relatively brittle mechanical part or mechanisms, such as a reclining device. Considering such defective aspect, as commonly done in the art, a deformable area is defined in a predetermined point in either the seat cushion frame or the seat back frame, so that, upon the excessive great impact being imparted to the seat cushion frame, the deformable area is quickly deformed to absorb the excessive great impact, thereby avoiding excessive stress intensively caused in the reclining device or other brittle mechanisms.

Examples of the foregoing impact absorption arrangement include: an impact absorption arrangement in a lateral frame member of seat back frame, as disclosed in the Japanese Laid-Open Patent Publication No. 7-132767 or JP 7-132767 A; and an impact absorption arrangement in a lateral fame member of seat cushion frame, as disclosed in the U.S. Pat. No. 7,360,832.

According to the JP 7-132767, predetermined localized areas in the lateral frame member of seat back frame are so formed to have deformable regions of a wavy cross-section, so that, in the case of rear-end collision, such wavy deformable regions, upon receiving an excessive great load, are buckled or collapsed to absorb a corresponding excessive great impact. On the other hand, the U.S. Pat. No. 7,360,832 teaches a rectangular or closed cross-section configuration of seat cushion frame's lateral frame member and an opened cross-section area defined in that closed cross-section structure, so that, upon an excessive great load being applied to the seat in the case of rear-end collision, a localized wall region of the seat cushion frame's lateral frame member at such opened cross-section area is deformed to thereby absorb a corresponding excessive great impact.

However, the foregoing conventional impact absorption arrangements are not simple in structure and thus require processes forming the complicated deformable areas as well as the peripheral areas around the deformable areas, which in turn requires troublesome designs and adjustments to determine a proper deformability of the deformable areas and also increases costs involved.

SUMMARY OF THE INVENTION

In view of the above-stated drawbacks, it is a purpose of the present invention to provide an improved vehicle seat which is of a simplified structure effective for absorbing an excessive great impact in the case of rear-end collision.

In order to achieve such purpose, a vehicle seat in accordance with the present invention is basically comprised of;

a seat cushion frame including a first lateral frame member and a second lateral frame member, wherein the first lateral frame member has a forward portion facing forwardly of the vehicle and a backward portion facing backwardly of the vehicle, whereas the second lateral frame member has a forward portion facing forwardly of the vehicle and a backward portion facing backwardly of the vehicle;

a stationary gear element fixedly secured on the forward side of the floor of vehicle, the stationary gear element having an arcuate gear region which faces backwardly of the vehicle;

a drive pinion having a connecting shaft rotatably connected with the forward portion of the first lateral frame member, the drive pinion being in meshed engagement with the arcuate gear region of the stationary gear element;

a first front link element so formed to have: a lower portion pivotally secured on the floor of vehicle; and an upper portion having: a first pivotal connection point which is pivotally connected with the connecting shaft associated with the drive pinion; and a second pivotal connection point;

a second front link element having: a lower portion pivotally secured on the floor of vehicle; and an upper portion having: a first pivotal connection point which is pivotally connected with the forward portion of the second lateral frame member; and a second pivotal connection point;

a first rear link element having: an upper portion movably connected with the backward portion of the first lateral frame member; and a lower portion pivotally secured on the floor of vehicle;

a second rear link element having: an upper portion movably connected with the backward portion of the second lateral frame member; and a lower portion pivotally secured on the floor of vehicle;

a first connecting link element which is at the forward end portion thereof pivotally connected with the second pivotal connection point of the first front link element, while being at the backward end portion thereof pivotally connected with the upper portion of the first rear link element;

wherein the second pivotal connection point of the first front link element is defined at a fixed point forwardly of and distant from the first pivotal connection point of the first front link, a second connecting link element which is at the forward end portion thereof pivotally connected with the second pivotal connection point of the second front link element, while being at the backward end portion thereof pivotally connected with the upper end portion of the second rear link element, and wherein the second pivotal connection point of the second front link element is defined at a fixed point forwardly of and distant from the first pivotal connection point of the second front link element, Preferably, the foregoing seat may be arranged such that, at the fixed point, the second pivotal connection point of the first front link element is also defined above the first pivotal connection point of the first front link element, and that, at the fixed point, the second pivotal connection point of the second front link element is also defined above the first pivotal connection point of the second front link element.

Preferably, a connecting rod may be extended between the second pivotal connection point of the first front link element and the second pivotal connection point of the second front link element.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 4, there is illustrated a preferred embodiment of vehicle seat generally designated by (S) in accordance with the present invention, which is provided with a seat lifter mechanism (not designated) for adjustment in height of the seat.

As shown, the seat (S) is comprised of a seat cushion (SC) and a seat back (SB) rotatably connected with the seat cushion (SC), with a reclining device (not shown) operatively provided at a joint point between the seat cushion and seat back (SC) (SB) to allow the seat back (SB) be adjustably inclined forwardly and backwardly relative to the seat cushion (SC), as known in the art.

Figure 1:
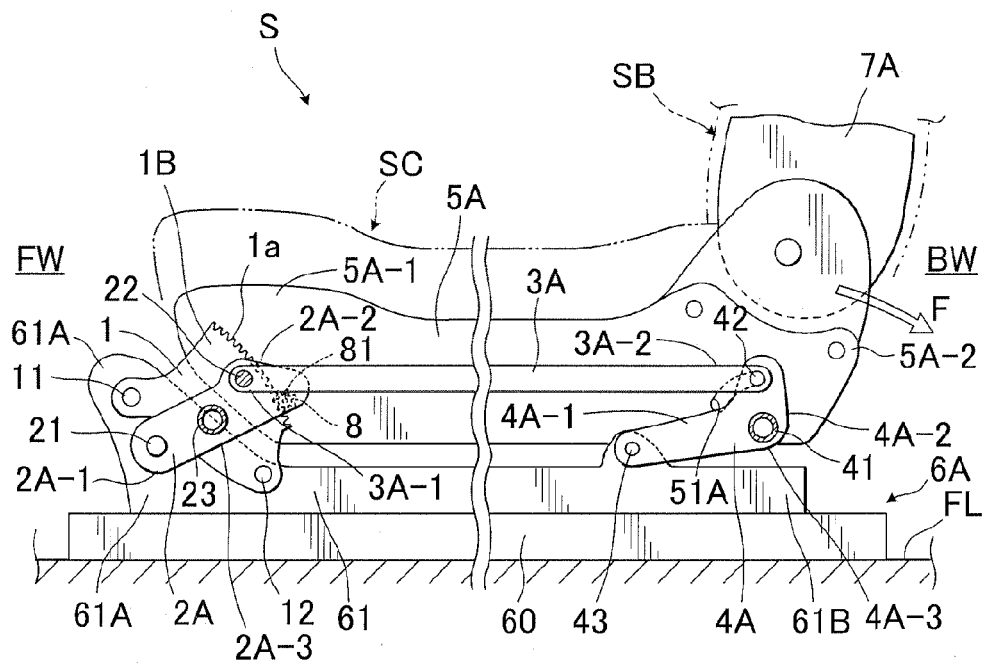
FIG. 1 is a side view showing a left side of vehicle seat and also a left-side seat framework of the vehicle seat in accordance with the present invention.
Figure 2:
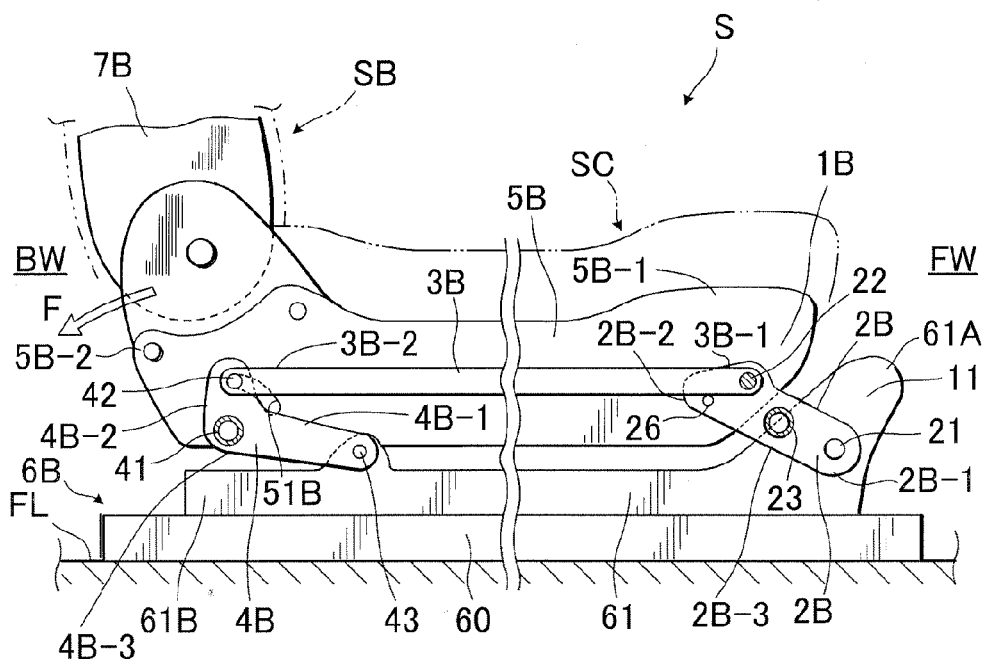
FIG. 2 is a side view showing a right side of the vehicle seat.

Taking a comparative view between FIG. 1 and FIG. 2, it is to be understood that a pair of left- and right-side lateral frame members (5A) and (5B) are one of the constituent elements of a seat cushion frame (not designated) provided in the seat cushion (SC), whereas a pair of left- and right-side lateral frame members (7A) and (7B) are one of the constituent elements of a seat back frame (not designated) provided in the seat back (SB), as commonly known in the art.

While not shown, as required, a front cross frame member may be fixedly connected between the two forward end portions of the left- and right-side lateral frame members (5A) (5B), and a rear cross frame member be fixedly connected between the two backward end portions respectively of the left- and right-side lateral frame members (5A) (5B), as known in ordinary seat cushion framework.

Of course, an upholstery, which includes a trim cover assembly and a foam padding, is properly attached over the above-described seat cushion frame to form the seat cushion (SC), and likewise, such upholstery is also properly attached over the above-described seat back frame to form the seat back (SB)

It is to be noted that the wording "forward" or "forwardly" refers to a forward side (FW) facing forwardly of the seat (S), whereas the wording "backward" or "backwardly" refers to a backward side (BW) facing backwardly of the seat (S).

Designation (6A) and (6B) denote a pair of left- and right-side seat slide devices for adjustment in position of the seat (S) in forward and backward directions. The left-side seat slide device (6A) is provided between the left-side lateral frame members (5A) and the floor (FL), whereas the right-side seat slide device (68) is provided between the right-side lateral frame members (5B) and the floor (FL). As shown, each of the two seat slide devices (6A) (6B) typically comprises upper and lower rails (61) and (60), wherein the upper rail (61) are slidably engaged with the lower rails (60) fixed on the floor (FL), as known in the art.

FIG. 1 depicts a left side of the seat (S), from which it is to be understood that there are shown an inward surface of the left-side lateral frame member (5A) and inward sides of the left-side upper and lower rails (61) (60), and that both of those inward surface and inward sides naturally face inwardly of the seat (S). On the other hand, FIG. 2 depicts a right side of the seat (S), from which it is to be understood that there are shown an inward surface of right-side lateral frame member (5B) and inward sides of the right-side upper and lower rails (61) (60) and that both of those inward surface and inward sides naturally face inwardly of the seat (S)

In this connection, the left- and right-side lateral frame members (5A) (5B) are spaced apart from each other, with the two inward surfaces respectively of those two lateral frame members (5A) (5B) being in an opposingly faced relation with each other.

Now, on the understanding of the foregoing illustration in the drawings, a description will be made of the vehicle seat (S) of the present invention in further details.

As stated earlier, the seat (S) is provided with a seat lifter mechanism which is not designated in the Figures. In accordance with the present invention, as one of the constituent parts of such seat lifter mechanism, there are provided: a pair of left- and right-side front links (2A) and (2B), each being formed from a rigid plate material of substantially rectilinearly extending shape; and a pair of left- and right-side rear links (4A) and (4B), each being formed from a rigid plate material of a substantially dogleg or "L" shape.

Basically, those four links (2A, 2B, 4A and 4B) are arranged in a vertically movable manner between the seat cushion (SC) and two seat slide devices (6A) (6B) (or a floor of vehicle designated by FL) in a parallel linkage fashion, as found in the art, such that the two front links (2A) (2B) are maintained in a parallel relation with the respective two rear links (4A) (4B), whenever those all four links are pivotally articulated vertically in synchronized way.

In this context, the two lower end portions (2A-1) (2B-1) respectively of the left- and right-side front links (2A) (2B) are pivotally connected via the respective two pins (21) (21) with the two upper rails' forward end portions (61A) (61A), respectively, whereas on the other hand, the two lower end portions (4A-1) (4B-1) respectively of the left- and right-side rear links (4A) (4B) are pivotally connected via the respective two pins (43) (43) with the two upper rails' backward end portions (61 B) (61B), respectively. It is noted here that the seat slide devices (SL) may not be used, in which case, all four links' lower end portions (2A-1, 2B-1, 4A-1 and 4B-1) may be directly or indirectly attached on the floor (FL) in an appropriate manner, using a suitable means.

Figure 4:
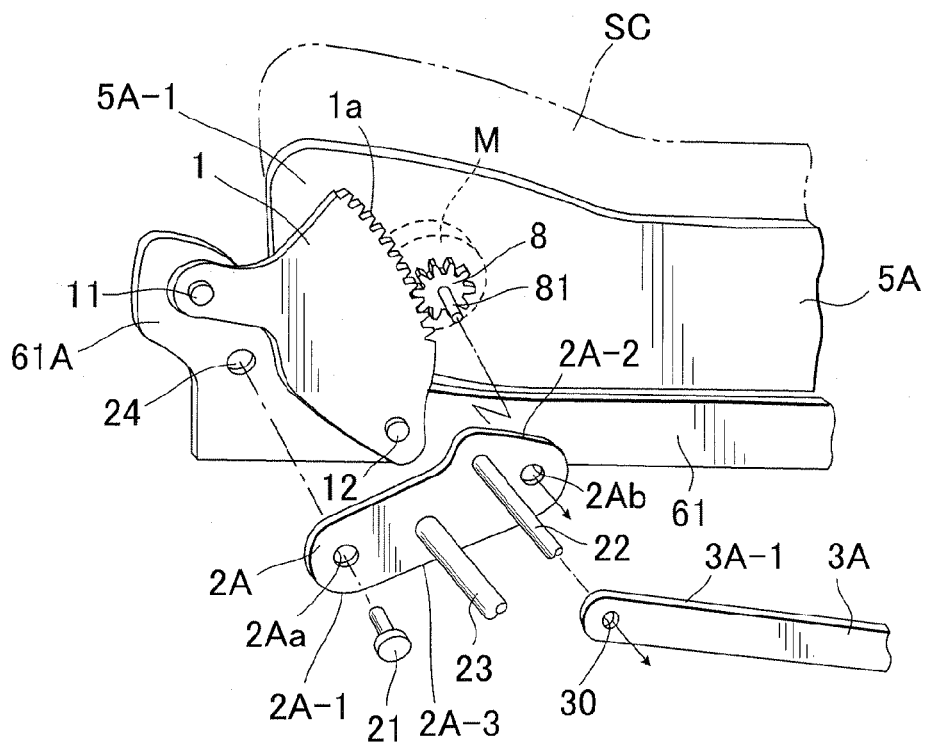
FIG. 4 is a partly broken and exploded perspective view showing several constituent elements forming the principal part of the invention.

Further, briefly stated, as a drive source for actuating the seat lifter mechanism, a motor (M) is provided only on the side of the left lateral frame member (3A) as shown in FIG. 4. The motor (M) has an output shaft fixedly coupled with a connecting rod (81) fixed to a drive pinion (8). The detailed arrangements and actions in this regard will be explained later.

A front connecting shaft (23) is fixedly connected between the two intermediate portions (2A-3) (2B-3) respectively of the left- and right-side front links (2A) (2B). In other words, the front connecting shaft (23) is of a tubular configuration, having a hollow therein, and as understandable from the hatched cross-section thereof and by comparatively looking at the FIGS. 1 and 2 in conjunction with FIG. 3, it is to be seen that the front connecting shaft (23) itself is extended horizontally between the two intermediate portions (2A-3) (2B-3) respectively of the left- and right-side front links (2A) (2B), and, more specifically, the front connecting shaft (23) is at the left-side end thereof welded fast to the intermediate portion (2A-3) of the left-side front link (2A), while being at the right-side end thereof welded fast to the intermediate portion (2B-3) of the right-side front link (2B).

Due to such front connecting shaft (23), an upper portion of the left-side front link (2A), including the intermediate portion (2A-3) and the upper end portion (2A-2), as well as an upper portion of the right-side front link (2B), including the intermediate portion (2B-3) and the upper end portion (2B-2), are vertically rotatable together in synchronized way relative to the respective two pins (21) (21).

A rear connecting shaft (41) is also of a tubular configuration having a hollow therein, and as understandable from the hatched cross-section thereof and by comparatively looking at the FIGS. 1 and 2, it is to be understood that the rear connecting shaft (41) is extended horizontally between and fixedly connected with the respective two angled portions (4A-3) (4B-3) of the left- and right-side rear links (4A) (4B), and, more specifically, the rear connecting shaft (41) is at the left-side end thereof welded fast to the angled portion (4A-3) of the left-side front link (4A), while being at the right-side end thereof welded fast to the angled portion (4B-3) of the right-side front link (4B). Due to such rear connecting shaft (41), an upper portion of the left-side rear link (4A), including the angled portion (4A-3) and the upper end portion (4A-2), as well as an upper portion of the right-side rear link (4B), including the angled portion (4B-3) and the upper end portion (4B-2), are vertically rotatable together in synchronized way relative to the respective two pins (43) (43).

Figure 3:
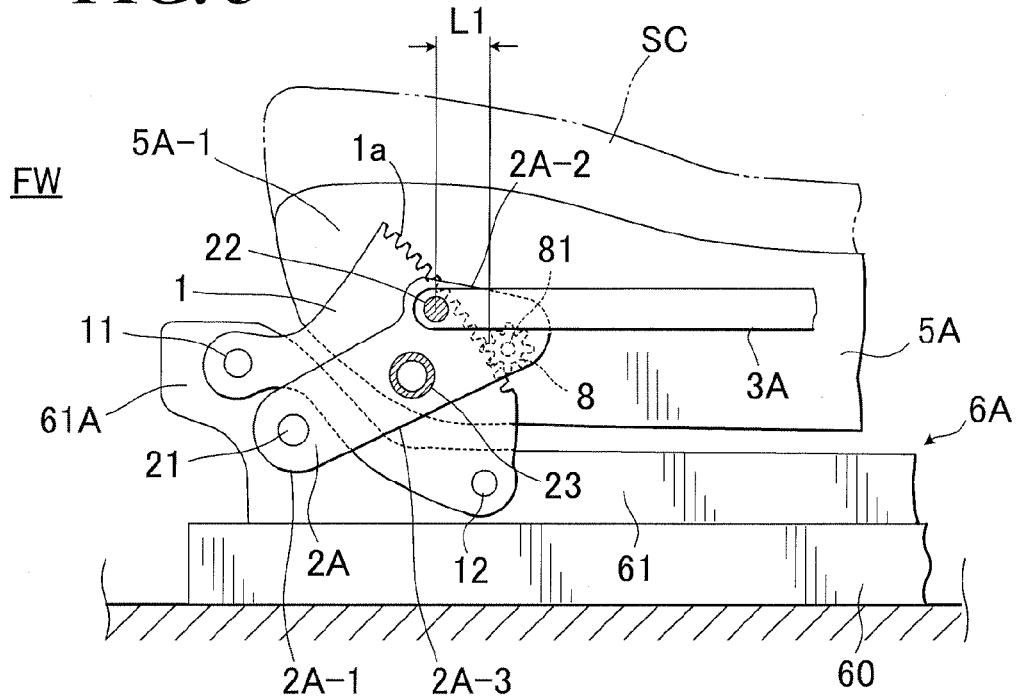
FIG. 3 is a fragmentary side view showing a principal part of the invention.

As seen in FIGS. 1 and 3, a stationary sector gear member (1) is firmly attached to the forward end portion (61A) of the left-side upper rail (61) by means of two fixing pins (11) (12). As shown, the stationary sector gear member (1) has an arcuate gear region (1*a*) formed therein and is interposed between the left-side upper rail's forward end portion (61A) and the left-side front link (2A) In this regard, of course, the left-side front link (2A) is slightly spaced apart from the sector gear plate member (1) so as to be out of contact therewith.

As best shown in FIG. 3, a drive pinion (8) is at the center thereof fixed to the connecting shaft (81) which is rotatably supported in the forward end portion (5A-1) of the lateral frame member (5A). The drive pinion (8) is in a meshed engagement with the afore-said arcuate gear region (1*a*) of the stationary sector gear member (1) As shown, a motor (M) is securely provided to the left-side lateral frame member (5A). Though not shown, the motor (M) is electrically connected with a switch and provided with a brake unit or reduction gear, as normally known in the art, and an output shaft of the motor (M) is fixedly connected with one end of the connecting shat (81). Hence, by operating the switch, the motor (M) works to rotate the drive pinion (8) in either of normal and reverse directions, and by turning off the switch, the motor (M) is stopped and locked by the brake unit or reduction gear against rotation.

Now, it is to be understood that the present invention focuses on the above-described seat structure wherein the combination of pinion (8) and stationary sector gear (1) are only disposed at the left-side lateral frame member (5A) to cause vertical rotation of all the four links (2A. 2B, 4A and 4B), and provides a simplified impact absorption arrangement in that type of seat structure in order to absorb an excessive great load (F) applied thereto as well as a corresponding excessive great impact, in the case of rear-end collision.

Reference being made to FIGS. 3 and 4, the left-side front link (2A) per se is basically of a known shape, but includes an upper widened end portion (2A-2) defined therein. As best seen in FIG. 4, in that upper widened end portion (2A-2), there are provided a connecting rod (22) and a connecting hole (2Ab). Specifically, as understandable from FIGS. 3 and 4, one end of the connecting rod (22) is fixedly connected with a forward end region of the upper widened end portion (2A-2), and the connecting rod (22) itself extends horizontally therefrom in a direction inwardly of the seat cushion (SC). As will be described, the other end of that connecting rod (22) is connected with the upper widened end portion (2B-2) of the right-side front link (2B).

In particular, it is observed that the connecting rod (22) is situated at a forward end region of the upper widened end portion (2A-2), whereas on the other hand, as best seen in FIG. 3, the connecting hole (24Ab) is formed in the backward end region of the upper widened end portion (2A-2) at a point below the connecting rod (22). Therefore, in the present invention, it is important to note that, in the front link's upper widened end portion (2A-2), the connecting rod (22) is disposed at a point forwardly of and above the connecting shaft (81), which is one of the important factors in the present invention as will become apparent later. Designation (2Aa) denotes a connecting hole formed in the lower end portion (2A-1) of front link (2A).

FIG. 4 shows how the thus-formed left-side front link (2A) is attached to the left-side lateral frame member's forward end portion (5A-1). As indicated therein, while passing the connecting shaft (81) through the connecting hole (2Ab) of the front link (2A), the other connecting hole (2Aa) of the front link (2A) is aligned with a connecting hole (24) formed in the upper rail's forward end portion (61A), after which, the pin (21) is inserted through those two aligned holes (2Aa) (24) and fixed to the upper rail's forward end portion (61A) in a proper manner. In that way, the left-side front link (2A) is at the upper end portion (2A-2) thereof rotatably connected with the connecting shaft (81) fixed to the drive pinion (8), while being at the lower end portion (2A-1) thereof pivotally connected with the forward end portion (61A) of the left-side upper rail (61) via the pin (21).

On the other hand, the right-side front link (2B) is illustrated in FIG. 2, which is identical in outer shape to the above-discussed left-side front link (2A) and therefore includes an upper widened end portion (2B-2) defined therein. The right-side front link (2B) is at that upper widened end portion (2B-2) thereof pivotally connected via a pin (26) with the forward end portion (5B-1) of the right-side lateral frame member (5B), while being at the lower end portion (2B-1) thereof pivotally connected via a pin (21) with the forward end portion (61A) of the right-side upper rail (61). In this regard, through not shown, a connecting hole, identical to the connecting hole (2Ab) of left-side front link (2B), is also formed in the backward end region of the upper widened end portion (2B-2), and therefore it is to be understood that the pin (26) passes through that connecting hole and is fixed to the right-side lateral frame member (5B). Thus, it is seen that the pin (26), forming an upper pivotal connection point of the right-side front link (2B) at the right-side lateral frame member (5B), is disposed in correspondence with the connecting shaft (81) forming an upper pivotal connection point of the left-side front link (2A) at the left-side lateral frame member (5A).

Further, fixedly connected to the forward end region of the upper widened end portion (2B-2) of the right-side front link (2B) is the previously mentioned other end of the connecting rod (22). Thus, taking a comparative view between FIGS. 1 and 2 in conjunction with FIG.4, it is seen that the connecting rod (22) is fixedly connected between the two upper widened end portions (2A-2) (2B-2) respectively of the left- and right-side front links (2A) (2B), and that, further, as similar to the left-side front link (2A) the connecting rod (22) is disposed at a point forwardly of and above the pin (26), As shown in FIG. 1, a left-side connecting link (3A) is extended between the left-side front and rear links (2A) and (4A). Specifically, referring to FIG. 4, this connecting link (3A) is shown as having a connecting hole (30) formed in the forward end portion (3A-1) thereof. As indicated by the arrow, by passing the afore-said connecting rod (22) through such connecting hole (30), the left-side connecting link's forward end portion (3A-1) is rotatably connected with the connecting rod (22) fixed to the upper widened end portion (2A-2) of left-side front link (2A). In other words, the left-side connecting link's forward end portion (3A-1) is pivotally connected via the connecting rod (22) with the left-side front link's upper widened end portion (2A-2). On the other hand, a backward end portion (3A-2) of the connecting link (3A) is pivotally connected, via a rear connecting pin (42), with the upper end portion (4A-2) of the left-side rear link (4A). The left-side rear connecting pin (42) is slidably secured in an arcuate guide hole (51A) formed in the backward end portion (5A-2) of left-side lateral frame member (5A). The arcuate guide hole (51A) extends along the circumference of a circle having its center at a central axis of the rear connecting shaft (41). Hence, when the left-side rear link (4A) is rotatively displaced vertically relative to the pin (43), the rear connecting pin (42) is slidingly moved in and along the arcuate guide hole (51A), which causes vertical displacement of the backward end portion (5A-2) of left-side lateral frame member (5A).

As shown in FIG. 2, a right-side connecting link (3B) is extended between the right-side front and rear links (2B) and (4B). Specifically, though not shown, this connecting link (3B) also has a connecting hole formed in the forward end portion (3B-1) thereof, the connecting hole being similar to the afore-said connecting hole (30). Thus, it is to be understood that, in the same manner described above for the left-side connecting links' forward end portion (3A-1), the right-side connecting link's forward end portion (3B-1) is also at the unshown connecting hole thereof rotatably connected with the connecting rod (22) fixed to the upper widened end widened (2B-2) of right-side front link (2B). In other words, the right-side connecting link's forward end portion (3E3-1) is pivotally connected, via the connecting rod (22), with the right-side front link's upper widened end portion (2B-2). On the other hand, a backward end portion (3B-2) of the connecting link (3B) is pivotally connected, via a rear connecting pin (42), with the upper end portion (4B-2) of the right-side rear link (4B). In this regard, the rear connecting pin (42) is slidably secured in an arcuate guide hole (51B) formed in the backward end portion (5A-2) of right-side lateral frame member (5B). The arcuate guide hole (51B) extends along the circumference of a circle having its center at a central axis of the rear connecting shaft (41). Hence, when the right-side rear link (4B) is rotatively displaced vertically relative to the pin (43), the rear connecting pin (42) is slidingly moved in and along the arcuate guide hole (51B), which causes vertical displacement of the backward end portion (5B-2) of right-side lateral frame member (5B).

As constructed above, upon operation of the motor (M), the drive pinion (8) is rotated, while being simultaneously displaced on and along the arcuate gear region (1*a*). This in turn cases simultaneous displacement of the connecting shaft (81) fixed to that drive pinion (8) in vertical and fore-and-aft directions relative to the pin (21). With such substantially vertical displacement of connecting shaft (81), both left- and right-side lateral frame members (5A) and (5B) are displaced away and towards the floor (FL) in substantially vertical direction, thereby simultaneously causing both two front links (2A) (2B) to displace rotatively in substantially vertical direction relative to the respective two pins (21) (21) in a synchronized way via the front connecting shaft (23). Further, simultaneous therewith, both two rear links (4A) (4B) are rotatively displaced in substantially vertical direction relative to the respective two pins (43) (43) in a synchronized way via the rear connecting shaft (41). With such mechanical arrangements; a seat occupant can control the motor (M) by operating a switch or the like (not shown) to adjustingly raise and lower the seat (S) to a desired level. When the seat occupant stops the motor (M) by turning off the switch, all the four links (2A, 2B, 4A and 4B) are stopped at a given angle of inclination relative to the slide devices (6A) (6B) or the floor (FL) and retained against movement due to the meshed engagement of the drive pinion (8) with the arcuate gear region (1*a*), so that the seat occupant can set the seat (S) at a desired level.

In accordance with the present invention, owing to the above-described seat structure, the following points are a significant aspect for absorbing an excessive great impact caused in the case of rear-end collision.

(a) The connecting rod (22) is connected between the upper widened end portion (2A-2) of left-side front link (2A) and the upper widened end portion (2B-2) of right-side front link (2B).

(b) As seen FIG. 1, the left-side end portion of the afore-said connecting rod (22) is disposed at a fixed location forwardly of and above the connecting shaft (81) which is rotatably supported in the left-side lateral frame member (5A) and connected with the drive pinion (8). Further, rotatably connected with that left-side end portion of connecting rod (22) is the forward end portion (3A-1) of the left-side connecting link (3A).

(c) As seen FIG. 2, the right-side end portion of the afore-said connecting rod (22) is disposed at a fixed location forwardly of and above the pin (26) which is rotatably connected with the right-side lateral frame member (5B). Further, rotatably connected with that right-side end portion of connecting rod (22) is the forward end portion (3B-1) of the right-side connecting link (3B).

With the above-noted arrangements, as readily understandable from the designation (L1) in FIG. 3, height-wise and length-wise distances between the connecting rod (22) and a meshed engagement point between the drive pinion (8) the arcuate gear region (1*a*) are unchanged or remain fixed, irrespective of the pinion (8) being moved on and along the arcuate gear region (1*a*) of stationary sector gear (1). Though not indicated in the Figures, height-wise and length-wise distances between the connecting rod (22) and the pin (26) disposed in correspondence with the connecting shaft (88) are also unchanged or remain fixed, irrespective of the pinion (8) being moved on and along the arcuate gear region (1*a*).

By virtue of such construction, when a rear-end collision occurs, an excessive great load (F) is applied to the seat (S) from an upper body portion of seat occupant (not shown) which is abruptly displaced backwardly and downwardly under inertia to the seat (S). In that case, the excessive great load (F) proceeds backwardly and downwardly as indicated by the arrows in FIGS. 1 and 2. Such excessive great load (F) is intensively exerted upon the rear end portions of the seat (S) and in particular upon the two rear links (4A) (4B). At that moment, however, most of the load (F) exerted on the two rear links (4A) (4B) is quickly transmitted though the two connecting links (5A) (5B) and connecting rod (22) to the two front links (2A) (2B) and equally dispersed in each of the two upper widened portions (2A-2) (2B-2) respectively of the left- and right-side front links (2A) (2B).

Then, dynamically stated, most of downward component of the load (F) is dispersed equally in each of those two upper widened end portions (2A-2) (2B-2) and transmitted therethrough down to each of the left- and right-side end portions of the front connecting shaft (23) near to the connecting rod (22), with very small amount of the downward component of load (F) being equally imparted to each of the connecting shaft (88) and pin (26) and transmitted therethrough to each of the left- and right-side lateral frame members (5A) (5B). In that way, most of the downward component of load (F) is dispersed and most of a corresponding impact is absorbed, whereby any of the pinion (8) and pin (26) is not damaged by the downward component of load (F). On the other hand, at the same time, a backward component of the load (F) is first dispersed equally in each of the two upper widened end portions (2A-2) (2B-2) respective of left- and right-side front links (2A) (2B) and reduced into a certain decreased amount of backward component of load (F) before being imparted to the connecting shaft (88) and pin (26). Then, so decreased amount of the backward component of load (F) is equally exerted upon each of the connecting shaft (88) and pin (26), but quicky transmitted therethrough to the left- and right-side lateral frame members (5A) (5B), so that the remaining amount of backward component of load (F) is equally dispersed in each of those two lateral frame members (3A) (3B), without giving any damage to both of the connecting shaft (88) and pin (26).

Consequently, most of the excessive great load (F), which is about to be intensively exerted on the two rear links (4A) (4B), is transmitted though the two connecting links (3A) (3B) and the connecting rod (22) equally to each of the two upper widen end portions (2A-2) (2B-2) respective of the two front links (2A) (2B) and dispersed therein, thereby avoiding direct exertion of a corresponding excessive great impact to the connecting shaft (88) and pin (26). At this moment, the excessive great load (F) is reduced in each of those two upper widened end portions (2A-2) (2B-2) into a certain decreased amount. Immediately thereafter, so reduced amount of the load (F) is quickly and equally transmitted through each of the connecting shaft (88) and pin (26) to each of the left- and right-side lateral frame members (3A) (3B) and dispersed therein, whereby most of a corresponding excessive great impact is absorbed. This insures to prevent both two rear links (4A) (4B) against deformation or backward inclination in the case of rear-end collision. Hence, the seat (S) is not lowered in any direction due to the rear-end collision and maintained at a normally required level.

Further, the meshed engagement of the arcuate gear regions (1$a$) with the drive pinion (8) and the disposition of drive pinions (8) on the side backwardly of the front link (2A) in effect renders the drive pinion (8) itself a stopper that serves to prevent downward displacement of both two front links (2A) (2B), while withstanding the excessive great load (F). Hence, a forward end portion of the seat cushion (SC) is retained substantially at a given level without being displaced downwardly in the case of rear-end collision. This is due to the fact that, when a rear-end collision occurs, an excessive great load (F) is applied to the seat (S) in the backward and downward direction, and in particular, the backward component of the load (F) is applied from the two front links (2A) (2B) directly to the drive pinion (8) at a large amount as compared with the downward component of the load (F), which strongly enhances the meshed engagement between the drive pinion (8) and the arcuate gear regions (1$a$) to such an extent that the drive pinion (8) and front links (2A and 2B) are not rotated in any direction. Thereby, both two lateral frame members' forward end portions (5A-1) (5B-1) are locked against downward displacement, so that the forward end portion of the seat cushion (SC) is not lowered, but retained at a level substantially equal to the level where it has been positioned before the rear-end collision. In this regard, if the excessive great load (F) transmitted to the front links (2A) (2B) and the drive pinion (8) exceeds a predetermined or expected degree of the above-discussed stopper effect of drive pinion (8) as well as a predetermined or expected degree of braking effect of a brake unit provided with the motor (M), then it is possible that the drive pinion (8) may be rotated slightly downwards on and along the arcuate gear region (1$a$) of stationary sector gear member (1), which is however a very slight downward rotation that will not result in any undesired lowering of the seat (S).

Accordingly, in accordance with the present invention, it is to be appreciated that a pair of connecting links (3A) (3B) are simply provided between the four links (2A, 2B, 4A and 4B) and that one connecting rod (22) is simply connected between the two front links (2A) (2B) and arranged such that one end portion thereof is disposed forwardly of and above the drive pinion (8) whereas the other end portion thereof is disposed forwardly of and above the pin (26), thereby making it extremely easy to achieve a robust construction to absorb an excessive great impact that may be caused in the case of rear-end collision and prevent deformation of any one of those four links. As such, the following advantageous effects are attained: (i) there is no need for increasing the thickness of each of the front and rear links (2A, 2B, 4A and 48) for reinforcement to withstand the excessive great load (F); (ii) no special element or mechanism is required for preventing deformation of any one of the front and rear links (2A, 2B, 4A and 4B) in order to avoid lowering of the seat (S) which will be caused in the case of rear-end collision; and (iii) there is no need for increasing the height of both two lateral frame members (5A) (5B) in order to have a rigidity enough to withstand the excessive great load (F). This means that the seat (S) itself can be made small in size and also made light in weight, and further, the number of required component parts are greatly reduced for a lowest possible costs involved in the assembly of the seat (S)

While having described the present invention thus far, it is to be understood that the invention is not limited to the illustrated embodiment, but any modification, addition and replacement may be applied thereto, without departing from the scopes of the appended claims. For example, with regard to a drive source for the drive pinion (8), instead of the motor (M), an appropriate manual lever or manual rotating knob may be connected with the drive pinion (8), in which case, a brake unit or gear reduction unit be incorporated in that manual lever or knob, so that the drive pinion (8) will be locked against rotation every time the lever or knob is stopped at a given position.

What is claimed is:

1. A vehicle seat in combination with a floor of vehicle, in which said floor of vehicle has a forward side facing forwardly of the vehicle and a backward side facing backwardly of the vehicle, comprising:

a seat cushion frame including a first lateral frame member and a second lateral frame member, wherein said first lateral frame member has a forward portion facing forwardly of the vehicle and a backward portion facing backwardly of the vehicle, whereas said second lateral frame member has a forward portion facing forwardly of the vehicle and a backward portion facing backwardly of the vehicle;

a stationary gear element fixedly secured on said forward side of said floor of vehicle, said stationary gear element having an arcuate gear region which faces backwardly of the vehicle;

a drive pinion having a connecting shaft rotatably connected with said forward portion of said first lateral frame member, said drive pinion being in meshed engagement with said arcuate gear region of said stationary gear element;

a first front link element so formed to have: a lower portion pivotally secured on said floor; and an upper portion having: a first pivotal connection point which is pivotally connected with said connecting shaft associated with said drive pinion; and a second pivotal connection point;

a second front link element having: a lower portion pivotally secured on said floor; and an upper portion having: a first pivotal connection point which is pivotally connected with said forward portion of said second lateral frame member; and a second pivotal connection point;

a first rear link element having: an upper portion movably connected with said backward portion of said first lateral frame member; and a lower portion pivotally secured on said floor;

a second rear link element having: an upper portion movably connected with said backward portion of said second lateral frame member; and a lower portion pivotally secured on said floor;

a first connecting link element which is at the forward end portion thereof pivotally connected with said second pivotal connection point of said first front link element, while being at the backward end portion thereof pivotally connected with said upper portion of said first rear link element;

wherein said second pivotal connection point of said first front link element is defined at a first fixed point forwardly of and distant from said first pivotal connection point of the first front link throughout the whole range of pivotal motion of the first front link, a second connecting link element which is at the forward end portion thereof pivotally connected with said second pivotal connection point of said second front link element, while being at the backward end portion thereof pivotally connected with said upper end portion of said second rear link element, and wherein said second pivotal connection point of said second front link element is defined at a second fixed point forwardly of and distant from said first pivotal connection point of the second front link element, and wherein, even when said first and second front links are moved forwardly and backwardly relative to said floor upon rotation of said drive pinion, a distance between said second pivotal connection point and a meshed engagement point between said drive pinion and said arcuate gear region remains unchanged or fixed, irrespective of said pinion being moved on and along said arcuate gear region.

2. The vehicle seat as claimed in claim 1, which is arranged such that, at said first fixed point, said second pivotal connection point of said first front link element is also defined above said first pivotal connection point of the first front link element, and that, at said second fixed point, said second pivotal connection point of said second front link element is also defined above said first pivotal connection point of the second front link element.

3. The vehicle seat as claimed in claim 1, wherein a connecting rod is extended between said second pivotal connection point of said first front link element and said second pivotal connection point of said second front link element.

* * * * *